(12) United States Patent
Meena

(10) Patent No.: US 12,238,215 B2
(45) Date of Patent: Feb. 25, 2025

(54) METHOD AND SYSTEM FOR PROVIDING PUBLIC CLOUD TOKENIZATION SERVICE FOR HIGHLY CONFIDENTIAL DATA

(71) Applicant: JPMorgan Chase Bank, N.A., New York, NY (US)

(72) Inventor: Prabhu Meena, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 190 days.

(21) Appl. No.: 18/076,793

(22) Filed: Dec. 7, 2022

(65) Prior Publication Data

US 2023/0224159 A1    Jul. 13, 2023

Related U.S. Application Data

(60) Provisional application No. 63/266,586, filed on Jan. 10, 2022.

(51) Int. Cl.
*H04L 9/32* (2006.01)
(52) U.S. Cl.
CPC ................. *H04L 9/3213* (2013.01)
(58) Field of Classification Search
CPC .................................... H04L 9/3213
See application file for complete search history.

(56) References Cited

U.S. PATENT DOCUMENTS

| | | | |
|---|---|---|---|
| 2015/0143112 A1 | 5/2015 | Yavuz et al. | |
| 2017/0201498 A1* | 7/2017 | Baig | G06F 21/6254 |
| 2018/0027006 A1* | 1/2018 | Zimmermann | H04L 63/0227 |
| | | | 726/11 |
| 2020/0137097 A1 | 4/2020 | Zimmermann et al. | |
| 2021/0234673 A1* | 7/2021 | Kurian | H04L 9/3234 |
| 2022/0035775 A1* | 2/2022 | Sriharsha | G06F 18/2115 |
| 2022/0247785 A1* | 8/2022 | Ly | H04L 63/1425 |
| 2022/0270129 A1* | 8/2022 | Dakic | G16H 40/67 |
| 2022/0311597 A1* | 9/2022 | Goel | H04L 9/0891 |

OTHER PUBLICATIONS

International Search Report and Written Opinion in corresponding International Application No. PCT/US2022/052119, dated Mar. 7, 2023.

* cited by examiner

*Primary Examiner* — Techane Gergiso
(74) *Attorney, Agent, or Firm* — GREENBLUM & BERNSTEIN, P.L.C.

(57) ABSTRACT

A method for using encryption and tokenization to protect confidential data that is stored in a public cloud database is provided. The method includes: receiving a first data set; tokenizing the first data set; obtaining a first token for at least one attribute of the first data set; encrypting an original value of the attribute and the first data set; storing each of the original value of the at least one attribute, the encrypted value of the at least one attribute, and the first token in a first memory; storing each of the first token and the encrypted first data set in a second memory; and storing the tokenized first data set in a third memory that is hosted on a public cloud server.

18 Claims, 6 Drawing Sheets

METHOD AND SYSTEM FOR PROVIDING PUBLIC CLOUD TOKENIZATION SERVICE FOR HIGHLY CONFIDENTIAL DATA

CROSS-REFERENCE TO RELATED APPLICATIONS

This application claims priority benefit from U.S. Provisional Application No. 63/266,586, filed Jan. 10, 2022, which is hereby incorporated by reference in its entirety.

BACKGROUND

1. Field of the Disclosure

This technology generally relates to methods and systems for protecting confidential data, and more particularly to methods and systems for using encryption and tokenization to protect confidential data that is stored in a public cloud database.

2. Background Information

Organizations are increasingly focused on leveraging the power of the public cloud to transform existing businesses and bring new innovative solutions. Data privacy and security is one of the top concerns organizations share with respect to public cloud adoption.

In addition to data center and network security, application developers must understand the need of protecting client sensitive data from any data breach within public clouds. In particular, protection of Highly Confidential Data (HCD), both while in transit and while at rest, is a key requirement when migrating a workload from on-premise to the public cloud.

Traditionally, encryption could be used to protect data stored in the public cloud. However, much of the data in the cloud needs further computation. This approach makes it difficult to query and process data within the public cloud. There is an additional complexity of dealing with encryption key management and application integration. This approach also leads to application performance overhead.

Accordingly, there is a need for a mechanism to provide protection for confidential data while at rest in a public cloud database by using encryption and tokenization.

SUMMARY

The present disclosure, through one or more of its various aspects, embodiments, and/or specific features or sub-components, provides, inter alia, various systems, servers, devices, methods, media, programs, and platforms for using encryption and tokenization to protect confidential data that is stored in a public cloud database.

According to an aspect of the present disclosure, a method for using encryption and tokenization to protect confidential data is provided. The method is implemented by at least one processor. The method includes: receiving, by the at least one processor, a first data set; tokenizing, by the at least one processor, the first data set; obtaining, by the at least one processor, a first token for at least one attribute of the first data set; encrypting, by the at least one processor, an original value of the at least one attribute and the first data set; storing, by the at least one processor, each of the original value of the at least one attribute, the encrypted value of the at least one attribute, and the first token in a first memory; storing, by the at least one processor, each of the first token and the encrypted first data set in a second memory; and storing, by the at least one processor, the tokenized first data set in a third memory.

The third memory may be hosted on a public cloud server.

The method may further include: receiving, from a user, a request for accessing data from the first data set; retrieving the tokenized first data set from the third memory; detokenizing the first data set; and transmitting, to the user, the requested data.

The obtaining of the first token may include generating the first token by using a zero hash collision function. Alternatively, the obtaining of the first token may include retrieving the first token from the first memory.

When the first memory becomes invalidated, the method may further include: retrieving, from the second memory, the first token and the encrypted first data set; decrypting the encrypted first data set; and using the decrypted first data set to recover the original value of the at least one attribute.

The third memory may not store any of the original value of the at least one attribute. Third memory may also not store an original value of any item included in the first data set.

The encrypting may include fetching at least one encryption key from a secure encryption service and using the at least one encryption key to perform the encrypting.

The tokenizing may include using an Amazon Web Services (AWS) Tokenization service. The first memory may include an Elastic Cache of the AWS Tokenization service. The second memory may include a Token Vault of the AWS Tokenization service.

According to another exemplary embodiment, a computing apparatus for using encryption and tokenization to protect confidential data is provided. The computing apparatus includes a processor; a first memory; and a communication interface coupled to each of the processor and the first memory. The processor is configured to: receive, via the communication interface, a first data set; tokenize the first data set; obtain a first token for at least one attribute of the first data set; encrypt an original value of the at least one attribute and the first data set; store each of the original value of the at least one attribute, the encrypted value of the at least one attribute, and the first token in the first memory; store each of the first token and the encrypted first data set in a second memory; and store the tokenized first data set in a third memory.

The third memory may be hosted on a public cloud server.

The processor may be further configured to: receive, from a user via the communication interface, a request for accessing data from the first data set; retrieve the tokenized first data set from the third memory; detokenize the first data set; and transmit, to the user via the communication interface, the requested data.

The processor may be further configured to obtain the first token by using a zero hash collision function to generate the first token. Alternatively, the processor may be further configured to obtain the first token by retrieving the first token from the first memory.

When the first memory becomes invalidated, the processor may be further configured to: retrieve, from the second memory, the first token and the encrypted first data set; decrypt the encrypted first data set; and use the decrypted first data set to recover the original value of the at least one attribute.

The third memory may not store any of the original value of the at least one attribute. The third memory may also not store any original value of any item included in the first data set.

The processor may be further configured to fetch at least one encryption key from a secure encryption service and use the at least one encryption key to perform the encryption.

The processor may be further configured to perform the tokenization by using an Amazon Web Services (AWS) Tokenization service. The first memory may include an Elastic Cache of the AWS Tokenization service. The second memory may include a Token Vault of the AWS Tokenization service.

According to yet another exemplary embodiment, a non-transitory computer readable storage medium storing instructions for using encryption and tokenization to protect confidential data is provided. The storage medium includes executable code which, when executed by a processor, causes the processor to: receive a first data set; tokenize the first data set; obtain a first token for at least one attribute of the first data set; encrypt an original value of the at least one attribute and the first data set; store each of the original value of the at least one attribute, the encrypted value of the at least one attribute, and the first token in a first memory; store each of the first token and the encrypted first data set in a second memory; and store the tokenized first data set in a third memory.

The third memory may be hosted on a public cloud server.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
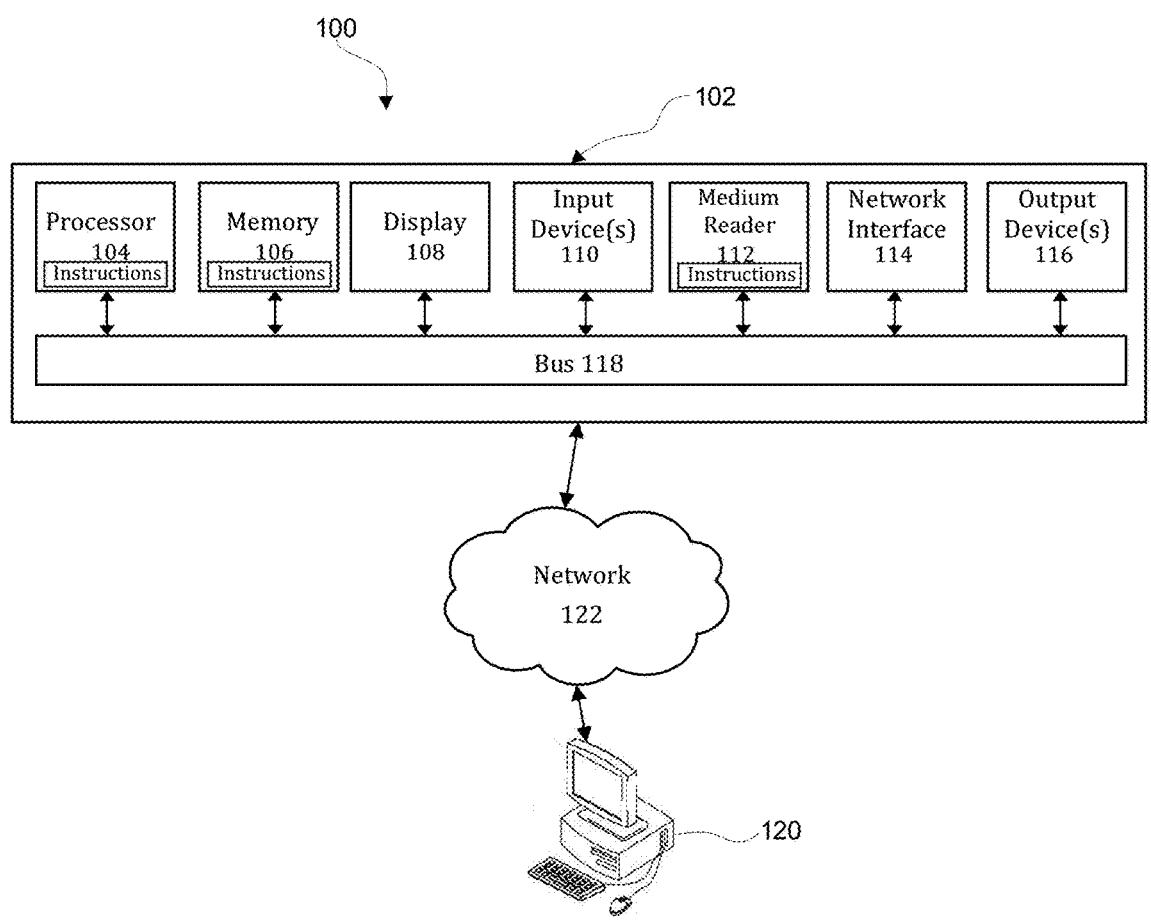
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using encryption and tokenization to protect confidential data that is stored in a public cloud database.

Figure 2:
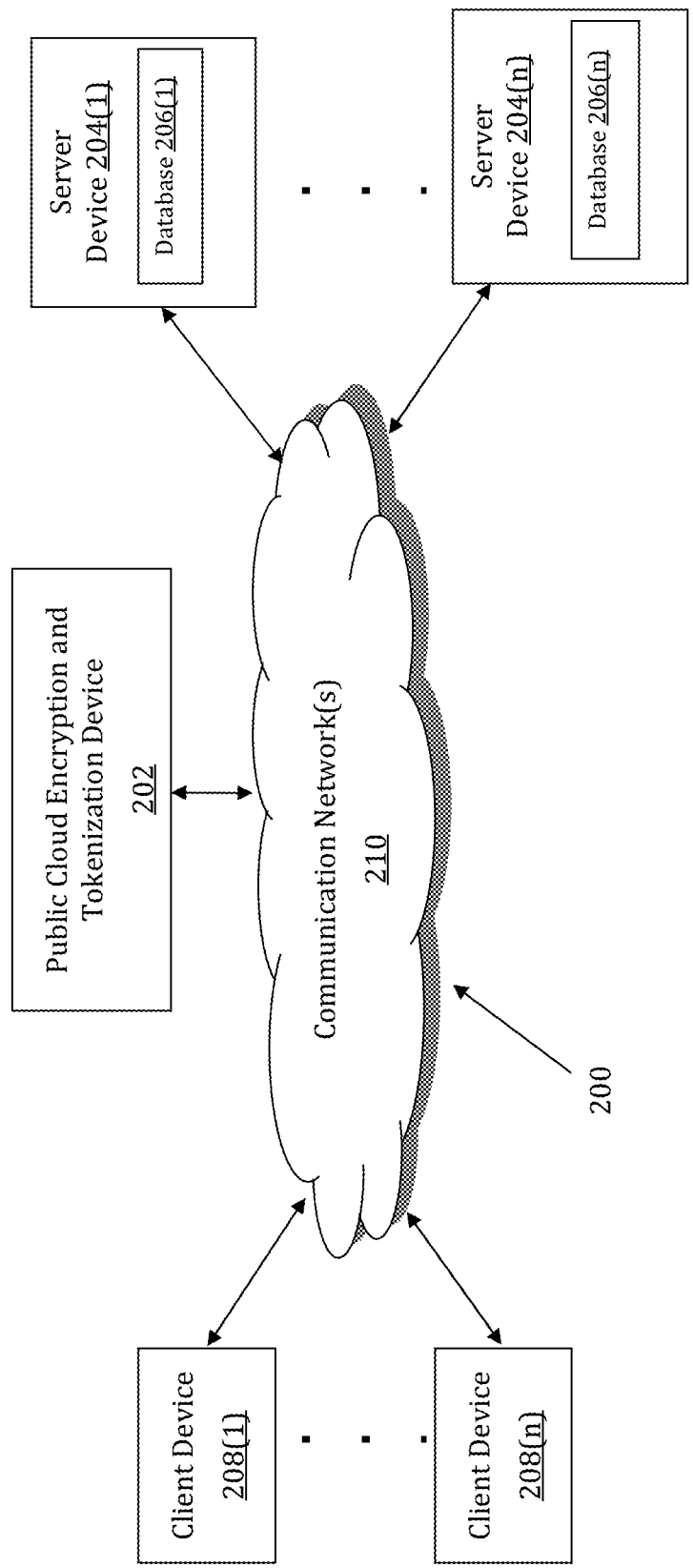
FIG. 2 illustrates an exemplary diagram of a network environment.

Referring to FIG. 2, a schematic of an exemplary network environment 200 for implementing a method for using encryption and tokenization to protect confidential data that is stored in a public cloud database is illustrated. In an exemplary embodiment, the method is executable on any networked computer platform, such as, for example, a personal computer (PC).

The method for using encryption and tokenization to protect confidential data that is stored in a public cloud database may be implemented by a Public Cloud Encryption and Tokenization (PCET) device 202. The PCET device 202 may be the same or similar to the computer system 102 as described with respect to FIG. 1. The PCET device 202 may store one or more applications that can include executable instructions that, when executed by the PCET device 202, cause the PCET device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PCET device 202 itself, may be located in virtual server(s) running in a cloud-based computing environment rather than being tied to one or more specific physical network computing devices. Also, the application(s) may be running in one or more virtual machines (VMs) executing on the PCET device 202. Additionally, in one or more embodiments of this technology, virtual machine(s) running on the PCET device 202 may be managed or supervised by a hypervisor.

In the network environment 200 of FIG. 2, the PCET device 202 is coupled to a plurality of server devices 204(1)-204(n) that hosts a plurality of databases 206(1)-206(n), and also to a plurality of client devices 208(1)-208(n) via communication network(s) 210. A communication interface of the PCET device 202, such as the network interface 114 of the computer system 102 of FIG. 1, operatively couples and communicates between the PCET device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PCET device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PCET devices that efficiently implement a method for using encryption and tokenization to protect confidential data that is stored in a public cloud database.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PCET device 202 may be a standalone device or integrated with one or more other devices or apparatuses, such as one or more of the server devices 204(1)-204(n), for example. In one particular example, the PCET device 202 may include or be hosted by one of the server devices 204(1)-204(n), and other arrangements are also possible. Moreover, one or more of the devices of the PCET device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PCET device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to tokens and encryption keys and data that relates to applications.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PCET device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PCET device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PCET device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PCET device 202, the server devices 204(1)-204(n), or the client devices 208(1)-208(n), for example, may be configured to operate as virtual instances on the same physical machine. In other words, one or more of the PCET device 202, the server devices 204(1)-204(n), or the client devices 208(1)-208(n) may operate on the same physical device rather than as separate devices communicating through communication network(s) 210. Additionally, there may be more or fewer PCET devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
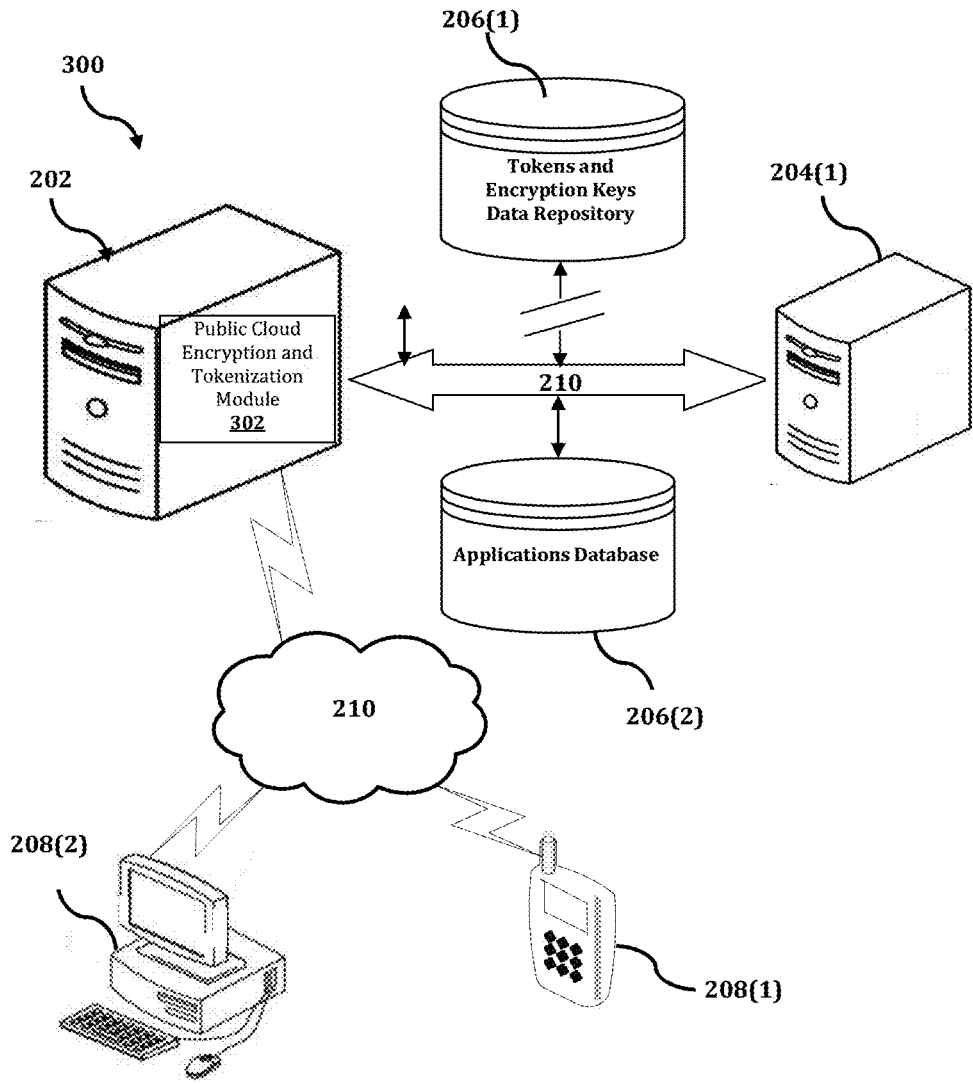
FIG. 3 shows an exemplary system for implementing a method for using encryption and tokenization to protect confidential data that is stored in a public cloud database.

The PCET device 202 is described and illustrated in FIG. 3 as including a public cloud encryption and tokenization module 302, although it may include other rules, policies, modules, databases, or applications, for example. As will be described below, the public cloud encryption and tokenization module 302 is configured to implement a method for using encryption and tokenization to protect confidential data that is stored in a public cloud database.

An exemplary process 300 for implementing a mechanism for using encryption and tokenization to protect confidential data that is stored in a public cloud database by utilizing the network environment of FIG. 2 is illustrated as being executed in FIG. 3. Specifically, a first client device 208(1) and a second client device 208(2) are illustrated as being in communication with PCET device 202. In this regard, the first client device 208(1) and the second client device 208(2) may be "clients" of the PCET device 202 and are described herein as such. Nevertheless, it is to be known and understood that the first client device 208(1) and/or the second client device 208(2) need not necessarily be "clients" of the PCET device 202, or any entity described in association therewith herein. Any additional or alternative relationship may exist between either or both of the first client device 208(1) and the second client device 208(2) and the PCET device 202, or no relationship may exist.

Further, PCET device 202 is illustrated as being able to access a tokens and encryption keys data repository 206(1) and an applications database 206(2). The public cloud encryption and tokenization module 302 may be configured to access these databases for implementing a method for using encryption and tokenization to protect confidential data that is stored in a public cloud database.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PCETT device 202 via broadband or cellular communication. Of course, these embodiments are merely exemplary and are not limiting or exhaustive.

Upon being started, the public cloud encryption and tokenization module 302 executes a process for using encryption and tokenization to protect confidential data that is stored in a public cloud database. An exemplary process for using encryption and tokenization to protect confidential data that is stored in a public cloud database is generally indicated at flowchart 400 in FIG. 4.

Figure 4:
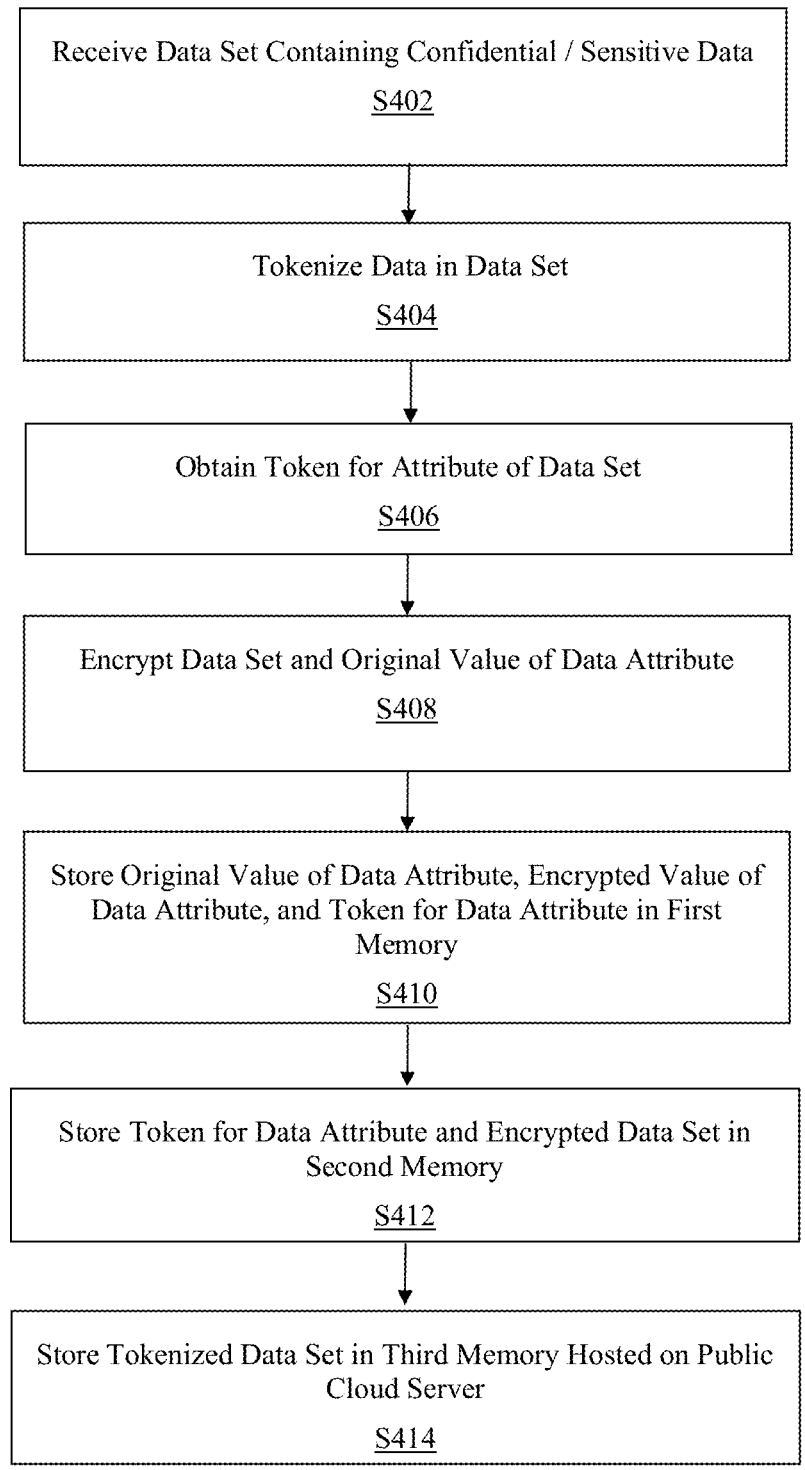
FIG. 4 is a flowchart of an exemplary process for implementing a method for using encryption and tokenization to protect confidential data that is stored in a public cloud database.

In process 400 of FIG. 4, at step S402, the public cloud encryption and tokenization module 302 receives a first data set that contains confidential and/or sensitive data. The first data set may be received, for example, from a user via an application that the user employs on a regular basis.

At step S404, the public cloud encryption and tokenization module 302 tokenizes the data included in the first data set. In an exemplary embodiment, the tokenization may be implemented by using a tokenization service that is commercially available, such as, for example, an Amazon Web Services (AWS) Tokenization Service.

At step S406, the public cloud encryption and tokenization module 302 obtains a token for an attribute of the first data set. In an exemplary embodiment, the data attribute token may previously have been generated and stored in a memory, such as, for example, a token vault, and in this circumstance, the data attribute token may be retrieved from the memory. Alternatively, the data attribute token may be generated by a tokenizer.

At step S408, the public cloud encryption and tokenization module 302 encrypts the first data set and also encrypts an original value of the data attribute. Then, at step S410, the public cloud encryption and tokenization module 302 stores the original value of the data attribute, the encrypted value of the data attribute, and the token for the data attribute in a first memory. The first memory may include, for example, an Elastic Cache of the AWS Tokenization Service.

At step S412, the public cloud encryption and tokenization module 302 stores the token for the data attribute and the encrypted first data set in a second memory. The second memory may include, for example, a Token Vault of the AWS Tokenization Service.

Then, at step S414, the public cloud encryption and tokenization module 302 stores the tokenized first data set in a third memory. In an exemplary embodiment, the third memory is hosted on a public cloud server. In this aspect, when the user subsequently desires to access the first data set, the public cloud encryption and tokenization service 302 retrieves the tokenized first data set from the third memory, detokenizes the data, and then transmits the detokenized data to the user.

In an exemplary embodiment, the conventional data encryption technique presents several challenges. A first challenge relates to a difficulty in encrypted data access and computation: Querying and processing encrypted data in a public cloud is a major challenge while using a conventional data encryption technique. Encrypted data/attributes cannot be queried, as every encryption of a same value generates a unique encrypted text. Also, it is not possible to compute any logic on encrypted data without decryption thereof, which is a very expensive process.

A second challenge relates to encryption/decryption key management complexity: A secure vault is needed in order to store encryption and decryption keys. This requirement adds overhead for the application developer to manage encryption/decryption key.

A third challenge relates to application integration overhead: The application developer must understand the data encryption requirements and integrate these requirements with the data encryption service.

A fourth challenge relates to application performance impact: Due to the frequency of encryption/decryption operations that are required for computation and storage, application performance is downgraded.

Figure 5:
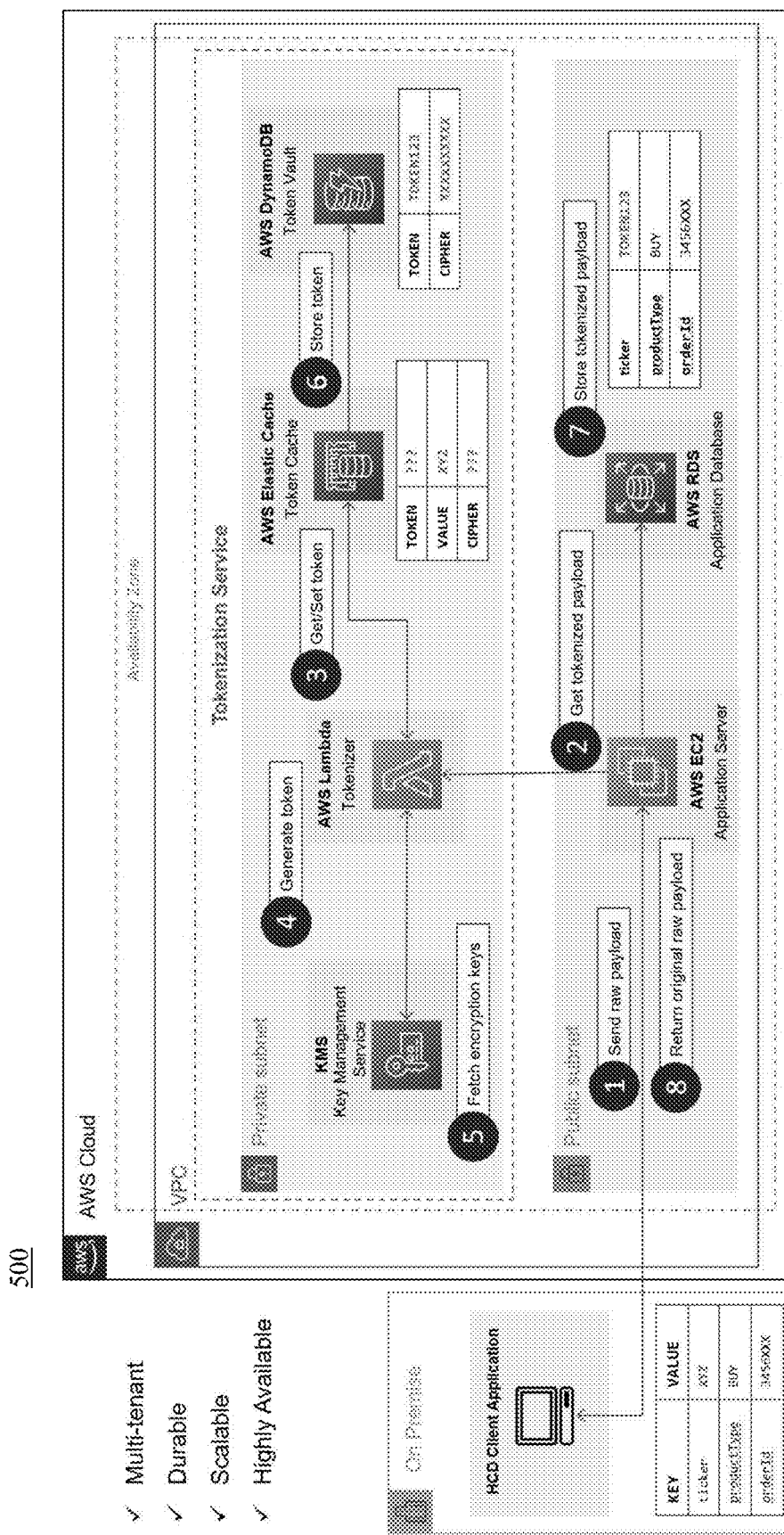
FIG. 5 is a flow diagram that illustrates a method for using encryption and tokenization to protect confidential data that is stored in a public cloud database, according to an exemplary embodiment.

In an exemplary embodiment, the aforementioned challenges are addressed by the methods and systems described in the present disclosure. FIG. 5 is a flow diagram 500 that illustrates a method for using encryption and tokenization to protect confidential data that is stored in a public cloud database, according to an exemplary embodiment. In this aspect, the AWS tokenization service is a multi-tenant platform that is technology-agnostic and cloud service provider-agnostic, durable, scalable and highly available. In an exemplary embodiment, the AWS tokenization service is used for tokenization; however, the methodology may be implemented with any other cloud provider.

The AWS tokenization service runs on AWS Lambda, which is a serverless compute engine and uses Elastic Cache as a high performance in-memory caching service as the token cache. DynamoDB is also used as a persistent storage layer to securely store the tokens and ciphers which can be used to rebuild the cache if necessary.

In an exemplary embodiment, the flow diagram 500 illustrates the following sequential operations: 1) Highly confidential application data is sent to the public cloud AWS service for data processing and storage into a database. 2) The AWS public cloud service invokes AWS tokenization service, using annotations to provide tokens for highly confidential data attributes. 3) The AWS tokenization service lookup is used for retrieving a data attribute token that is stored in the Elastic Cache. 4) If the token is not found, then the token is generated by performing step 5 and step 6.

5) The confidential data attribute is encrypted by using a secure encryption service, and a token is generated by using a zero hash collision function. 6) The data attribute token and the corresponding encrypted data are stored into the Token Vault in order to facilitate a rebuild of the Elastic Cache in the event that the Elastic Cache becomes invalidated. The Elastic Cache stores each of the original value of the data attribute, the tokenized value of the data attribute, and the encrypted value of the data attribute. In an exemplary embodiment, this storage strategy is based on an assumption that original highly confidential data value may be stored in cache memory. If the cache needs to repopulate, it will fetch the token and corresponding encrypted value from the Token Vault and then populate the cache with original values by decrypting encrypted data.

7) The application can now store tokenized data into a public cloud database that would allow for querying and processing data from application layer. 8) When a user queries the data, the application invokes the tokenization service to obtain original values from the Elastic Cache.

Figure 6:
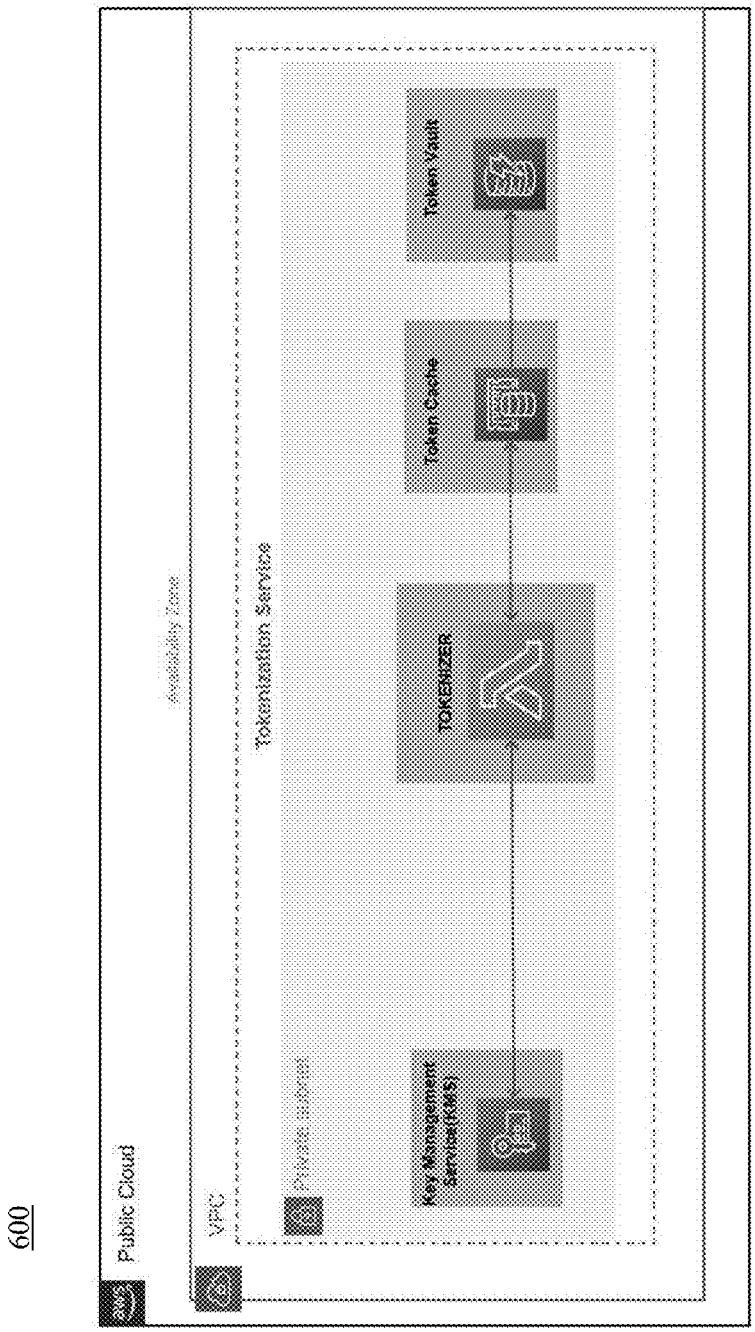
FIG. 6 is an architecture diagram that illustrates a structure of a tokenization service that is usable for performing a method for using encryption and tokenization to protect confidential data that is stored in a public cloud database, according to an exemplary embodiment.

FIG. 6 is an architecture diagram 600 that illustrates a structure of a tokenization service that is usable for performing a method for using encryption and tokenization to protect confidential data that is stored in a public cloud database, according to an exemplary embodiment.

In an exemplary embodiment, the tokenization service includes the following high-level components:

1) Tokenizer: This service is deployed centrally for applications and is responsible for handling complexity of encryption, tokenization, and lookup for applications using this service 2) Token Cache: This memory stores mappings of an original value, a tokenized value, and an encrypted value of an attribute of a highly confidential data set. The tokenizer service will look up or populate these data in the cache.

Token Vault: This memory is a secure data storage for storing tokens and encrypted values of highly confidential data. This storage does not store original values, and as such, it provides protection from data breach.

Key Management Service (KMS): A highly secure key management service is used to encrypt and decrypt data during token generation and rebuilding cache operations.

Accordingly, with this technology, an optimized process for using encryption and tokenization to protect confidential data that is stored in a public cloud database is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using encryption and tokenization to protect confidential data, the method being implemented by at least one processor, the method comprising:
    receiving, by the at least one processor, a first data set;
    tokenizing, by the at least one processor, the first data set;
    obtaining, by the at least one processor, a first token for at least one attribute of the first data set;
    encrypting, by the at least one processor, an original value of the at least one attribute and the first data set;
    storing, by the at least one processor, each of the original value of the at least one attribute, the encrypted value of the at least one attribute, and the first token in a first memory;
    storing, by the at least one processor, each of the first token and the encrypted first data set in a second memory; and
    storing, by the at least one processor, the tokenized first data set in a third memory,
    wherein the tokenizing comprises using an Amazon Web Services (AWS) Tokenization service; and wherein the first memory comprises an Elastic Cache of the AWS Tokenization service; and wherein the second memory comprises a Token Vault of the AWS Tokenization service.

2. The method of claim 1, wherein the third memory is hosted on a public cloud server.

3. The method of claim 2, further comprising:
    receiving, from a user, a request for accessing data from the first data set;
    retrieving the tokenized first data set from the third memory;
    detokenizing the first data set; and
    transmitting, to the user, the requested data.

4. The method of claim 1, wherein the obtaining of the first token comprises generating the first token by using a zero hash collision function.

5. The method of claim 1, wherein the obtaining of the first token comprises retrieving the first token from the first memory.

6. The method of claim 1, wherein when the first memory becomes invalidated, the method further comprises:
retrieving, from the second memory, the first token and the encrypted first data set;
decrypting the encrypted first data set; and
using the decrypted first data set to recover the original value of the at least one attribute.

7. The method of claim 1, wherein the third memory does not store any of the original value of the at least one attribute, and the third memory does not store an original value of any item included in the first data set.

8. The method of claim 1, wherein the encrypting comprises fetching at least one encryption key from a secure encryption service and using the at least one encryption key to perform the encrypting.

9. A computing apparatus for using encryption and tokenization to protect confidential data, the computing apparatus comprising:
a processor;
a first memory; and
a communication interface coupled to each of the processor and the first memory,
wherein the processor is configured to:
receive, via the communication interface, a first data set;
tokenize the first data set by using an Amazon Web Services (AWS) Tokenization service;
obtain a first token for at least one attribute of the first data set;
encrypt an original value of the at least one attribute and the first data set;
store each of the original value of the at least one attribute, the encrypted value of the at least one attribute, and the first token in the first memory;
store each of the first token and the encrypted first data set in a second memory; and
store the tokenized first data set in a third memory,
wherein the first memory comprises an Elastic Cache of the AWS Tokenization service; and wherein the second memory comprises a Token Vault of the AWS Tokenization service.

10. The computing apparatus of claim 9, wherein the third memory is hosted on a public cloud server.

11. The computing apparatus of claim 10, wherein the processor is further configured to:
receive, from a user via the communication interface, a request for accessing data from the first data set;
retrieve the tokenized first data set from the third memory;
detokenize the first data set; and
transmit, to the user via the communication interface, the requested data.

12. The computing apparatus of claim 9, wherein the processor is further configured to obtain the first token by using a zero hash collision function to generate the first token.

13. The computing apparatus of claim 9, wherein the processor is further configured to obtain the first token by retrieving the first token from the first memory.

14. The computing apparatus of claim 9, wherein when the first memory becomes invalidated, the processor is further configured to:
retrieve, from the second memory, the first token and the encrypted first data set;
decrypt the encrypted first data set; and
use the decrypted first data set to recover the original value of the at least one attribute.

15. The computing apparatus of claim 9, wherein the third memory does not store any of the original value of the at least one attribute, and the third memory does not store an original value of any item included in the first data set.

16. The computing apparatus of claim 9, wherein the processor is further configured to fetch at least one encryption key from a secure encryption service and use the at least one encryption key to perform the encryption.

17. A non-transitory computer readable storage medium storing instructions for using encryption and tokenization to protect confidential data, the storage medium comprising executable code which, when executed by a processor, causes the processor to:
receive a first data set;
tokenize the first data set by using an Amazon Web Services (AWS) Tokenization service;
obtain a first token for at least one attribute of the first data set;
encrypt an original value of the at least one attribute and the first data set;
store each of the original value of the at least one attribute, the encrypted value of the at least one attribute, and the first token in a first memory;
store each of the first token and the encrypted first data set in a second memory; and
store the tokenized first data set in a third memory,
wherein the first memory comprises an Elastic Cache of the AWS Tokenization service; and wherein the second memory comprises a Token Vault of the AWS Tokenization service.

18. The storage medium of claim 17, wherein the third memory is hosted on a public cloud server.

* * * * *